N. TAYLOR.
PLANT FOR MAKING TAR MACADAM.
APPLICATION FILED FEB. 16, 1914.

1,138,906.

Patented May 11, 1915.
3 SHEETS—SHEET 1.

Witnesses:
J. Clark Jefferson
Eric Scullin

Neil Taylor,
Inventor

N. TAYLOR.
PLANT FOR MAKING TAR MACADAM.
APPLICATION FILED FEB. 16, 1914.

1,138,906.

Patented May 11, 1915.
3 SHEETS—SHEET 2.

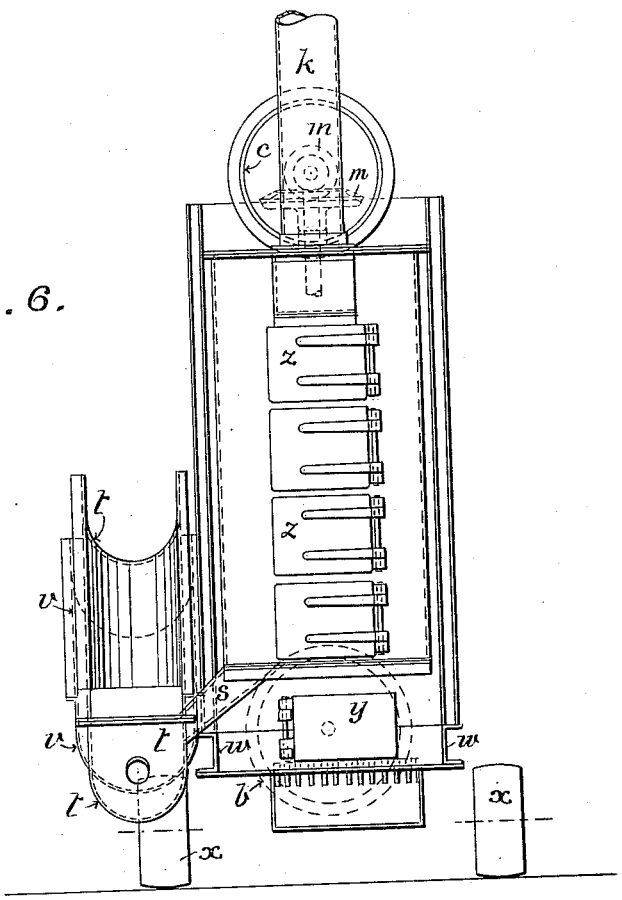

UNITED STATES PATENT OFFICE.

NEIL TAYLOR, OF LEEDS, ENGLAND.

PLANT FOR MAKING TAR MACADAM.

1,138,906.  Specification of Letters Patent.  Patented May 11, 1915.

Application filed February 16, 1914.  Serial No. 818,935.

*To all whom it may concern:*

Be it known that I, NEIL TAYLOR, a subject of the King of Great Britain and Ireland, residing at Leeds, in the county of York, England, have invented certain new and useful Improvements in Plants for Making Tar Macadam, of which the following is a specification.

This invention relates to means for drying and heating the stones or the like used in making tar macadam to a clean hot condition and in an economical manner, and in combination therewith and subsidiary thereto, an arrangement of coöperating parts particularly when it is desired to have the plant portable.

The object or objects of this invention is to provide a large heating surface and a long and slow passage of the stones to be heated and a long passage of the flue or heating gases through the heating apparatus, and so that the gases are not brought into contact with the stones, while the latter meet with a gradually increasing temperature.

The heating apparatus consists of a chamber divided by horizontal partitions into a number of alternating heating and flue spaces; the flue spaces being connected at the ends by short vertical flues, so as to give an ascending zig-zag passage for the products of combustion from a furnace. A rotating vertical shaft is passed vertically upward through said heating and flue spaces, and carries a number of scraper arms around with it in each heating space. Each heating space is connected to the heating spaces next above and below by passages through the intervening flue spaces said passages being separated, the passage to the heating space above being situated in advance, (so considered with reference to the direction of rotation of the revolving scraper arms), of the passage to the heating space next below, by an angular distance approximately equal to the angular width of said passages.

Figure 2:
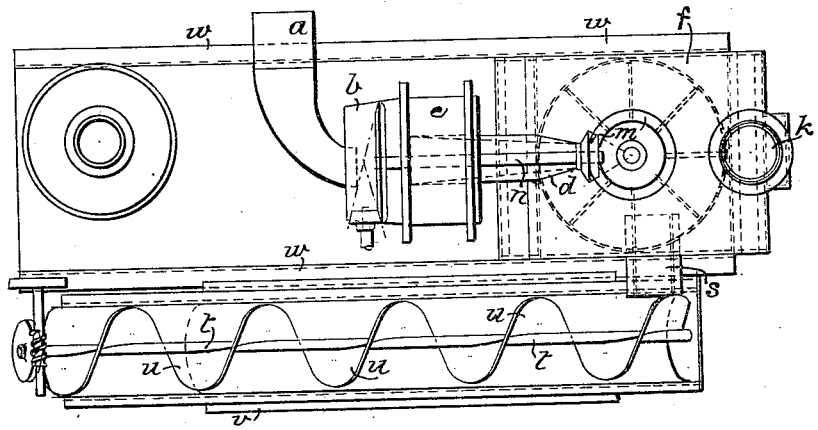
Figure 1:
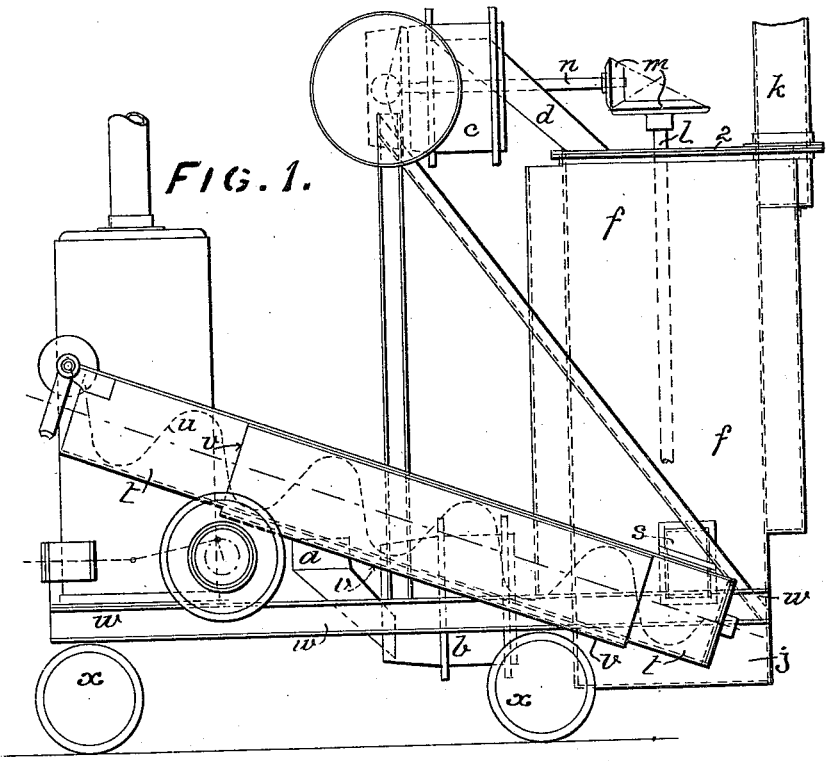
Figure 4:
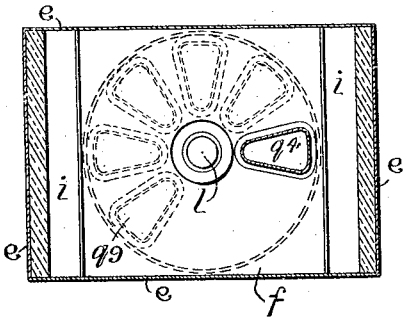
Figure 3:
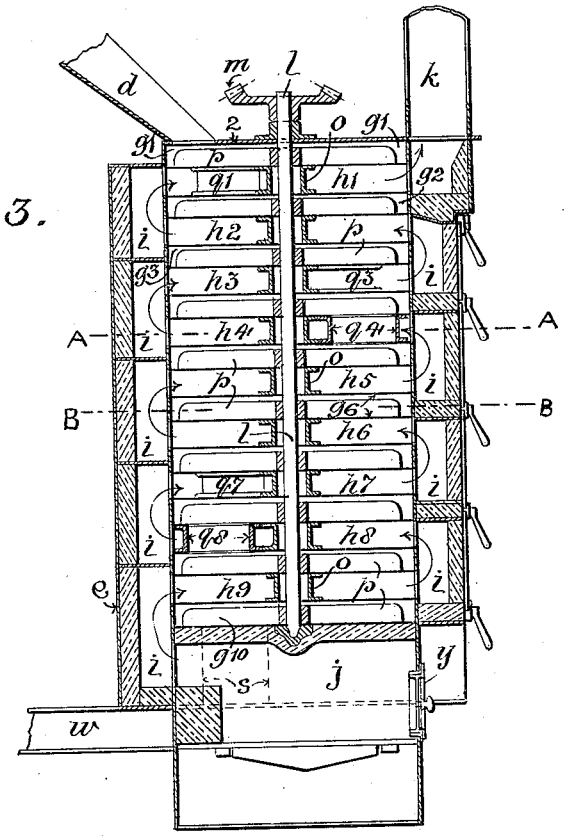

The invention is illustrated in the accompanying drawings, Figure 1 being an outside elevation of the plant as arranged when it is to have the same portable. Fig. 2 is a plan. Fig. 3 is a vertical section of the drying and heating portion of the apparatus. Figs. 4 and 5 are horizontal sections on lines A A and B B respectively of Fig. 3, and Fig. 6 is an end elevation.

$a$ Figs. 1 and 2 is a chute, into which the broken stones or other material to be dried, heated and tarred are fed, and delivered thence to the bottom drum $b$ of a bucket elevator, and from the top drum $c$ of the elevator by the chute $d$ to the top horizontal space $g^1$ Fig. 3 of the middle or drying chamber $(f)$, as it will hereinafter be called. The remainder of said elevator is not shown as such showing seems unnecessary to a comprehension of the invention. The drying chamber contains a number of so-called heating spaces $g^1$, $g^2$, etc., alternating with a number of flue spaces $h^1$, $h^2$, etc., the latter communicating two and two with short vertical side flues $i$ on both sides of the drying chamber, so that the flame and hot products of combustion from the furnace $j$ at the bottom below the drying chamber, take a zig-zag course as indicated by the arrows, through the drying chamber before finally escaping through the chimney $k$. The drying chamber and the vertical flues $i$ are contained in a single rectangular casing $e$, divided vertically into a middle so-called drying chamber and two outer flue chambers. A vertical shaft $l$ passes centrally through the drying chamber, and is driven by gearing $m$ from the shaft $n$ of the top elevator drum as shown in Fig. 1. Where the shaft $l$ passes through the flue spaces, it is protected from the hot gases, and the latter are prevented from escaping up the shaft space by flanged cylindrical castings $o$. In each of the heating spaces $g^1$, $g^2$, etc., a number of flat vertical scraper arms $p$, Figs. 3 and 5, are attached to the shaft $l$ so as to be carried around therewith.

The broken stones and the like falling from the chute $d$ into topmost heating space $g^1$, drop into the spaces between the scraper arms $p$, and are carried around, (say for the sake of illustration, through $337\frac{1}{2}$ degrees,) when they drop through a sector shaped opening cut out of the partition plate forming the bottom of this heating space. Then through a flanged sector shaped casting $q^1$ Fig. 2, inserted between this partition plate and the partition plate next below, so as to form a passage through the flue space $h^1$ next below the heating space $g^1$, but cut off from the flue space. On falling through the passage tube $q^1$ the stones drop into the spaces between the revolving scraper arms $p$ in the second heating space $g^2$, where they are again carried around through, (say as above) $337\frac{1}{2}$ degrees, that is a complete circle less the angular width of a passage tube, and drop through the passage tube $q^2$ in the next flue space $h^2$ to the third heating space $g^3$; and so on to the bottom of the drying chamber. As the ends of the scraper arms describe a circle, a circular rim plate $r$ Fig. 5 is placed on the partition plate to prevent stones accumulating in the corners of the rectangular heating space.

It will be evident that the arrangement of the sector shaped passage ($q^1$) in advance, (so considered with reference to the direction of rotation of the scraper arms,) of the passage $q^2$ next below by an angular distance or pitch approximately equal to the angular width, of said passage, in the case supposed $22\frac{1}{2}$ degrees, insures a very long or maximum drying passage of stones through the drying chamber. As the space between each adjoining pair of scrapers receives its own quota of stones, the latter are carried through the drying chamber with the same uniformity and regularity as that of delivery by the chute $d$; or the uniformity and regularity which is requisite for the regular output of a uniform product may even be enhanced by the passages of the stones through the apparatus. Also the stones are first heated by the flue gases when the latter are most cooled, and lastly when they are hottest, which is conducive to economy; while the stones do not at any time come in contact with the flue gases, so that their surfaces remain cleaner and better suited to receive and retain the tar. The hot dry stones are swept by the revolving scrapers $p$ in the last heating space $g^{10}$ into the side chute $s$ Fig. 6, the bottom of which may be perforated to allow the escape of material too fine to be tarred along with the stones.

The chute $s$ Figs. 1, 2 and 6 then delivers stones into the lower end of a long inclined tar trough $t$, containing a worm $u$ and forming a worm conveyer. The melted tar is supplied to the lower end of the trough in sufficient quantity to keep the stones as they are delivered, submerged; while the rotation of the worm $u$ mixes them and raises them to the upper end of the trough, the surplus tar draining on the way, the stones being finally discharged at the upper end into carts or on to the ground as required. The trough $t$ may be surrounded over a portion of its length by a shorter larger trough $v$, the ends of the space between the two being closed steam tight, so that the trough $v$ may serve as a steam jacket to keep the tar sufficiently hot to allow the surplus tar to drain back to the lower part of the tarring trough. The worm $u$ may be made of increasing pitch toward the upper end, so as to allow the stones to remain proportionately longer in contact with the tar.

Where it is desired to have the apparatus portable, the parts are mounted on a frame $w$ carried on wheels $x$, the furnace door $y$ being preferably at the rear end of the frame. The inclined tarring and mixing trough $t$ is carried at one side of the frame, and the bucket elevator is placed in the middle between the two side frames and in front of the heating and drying apparatus; and the feed chute $a$ is carried from the far side frame, all substantially as shown in the drawings. The outer sides of the side flues are lined with non-conducting material; doors $z$ Figs. 3 and 4 being also provided for sweeping out the flues. The alternate flue and heating sections may be conveniently formed by loose plates 1 Fig. 3 supported by angle iron or other supports fixed to the inner side of the walls of the drying chamber, so that they can be readily removed when required. For the same purpose the top 2 of the drying chamber may be bolted so as to be removable.

Having now particularly described my invention what I claim and desire to secure by Letters Patent is:—

1. In apparatus for drying, heating and tarring stones for making tar macadam, the combination on a frame mounted on wheels of a motor, a supply chute, an elevating conveyer, a second supply chute, a drying and heating chamber composed of an ascending zig-zag flue, and a circular stepwise descending heating passage, the horizontal portions of said flue and of said passage alternating with one another, scraper arms in the horizontal portions of said heating passage mounted on a rotating central vertical shaft, an inclined tarring, mixing and elevating trough and connecting mechanism between said motor and the elevating conveyer, central vertical shaft and the trough mixer and elevator, and a chute between the bottom horizontal portion of the heating passage and the lower end of the inclined tarring trough, substantially as set forth.

2. In apparatus for drying, heating and tarring stones for making tar macadam, the combination with a drying and heating chamber composed of alternate horizontal flue and heating sections, of short end vertical flues, passage tubes through the horizontal flue sections a central rotating vertical shaft, radial scrapers in each heating section carried by said vertical shaft, and a delivery chute from the bottom heating section, of an inclined trough, a rotating mixing elevating and discharging worm mounted in said trough and means for heating said chamber and for heating said trough substantially as set forth.

3. In apparatus for drying and heating stones for making tar macadam the combination in a drying and heating chamber of a number of alternate heating and flue sections formed by horizontal partitions, a zig-zag passage for the flame and hot gases consisting of said horizontal flue sections and short vertical end flues, a rotating vertical shaft extending vertically upward through said heating and flue spaces, a number of revolving scraper arms in each heating space attached to said vertical rotating shaft, an isolating sleeve and a passage tube in each flue space, the passage tube in any flue space being situated in advance (so considered with respect to the direction of rotation of the revolving scraper arms) of the passage tube in the next heating space below by an angular distance approximately equal to the angular width, referred to the revolving vertical shaft as center, of said tube passages, substantially as set forth.

4. In apparatus for drying and heating stones for making tar macadam, the combination in a drying and heating chamber of alternate horizontal heating and flue sections, a zig-zag passage formed of said horizontal flue sections and short vertical end flues, a rotating vertical shaft, a number of scraper arms in each of said heating sections attached to said rotating shaft, an isolating sleeve and a passage tube in each flue section, a chimney in communication with the topmost horizontal flue section, a furnace in communication with the bottom horizontal flue section and a delivery chute from the bottom heating section, substantially as set forth.

5. In apparatus for drying, heating and tarring stones for making tar macadam the combination on a frame mounted on wheels, of a heating and drying chamber at the rear, a endless chain elevator, a chute between the top drum of said elevator and the top of the heating and drying chamber, a supply chute at the receiving end of the bottom drum of the elevator, an inclined tarring mixing and elevating trough supported by one side of said frame, a chute from the bottom of the drying and heating chamber to the lower end of the inclined trough and driving connections between the motor and the chain elevator and the rotating worm of the inclined tarring trough.

6. In combination with means for supplying heated stones an inclined trough receiving them at its lower end, a steam jacket surrounding the upper part of said trough and a worm turning in the latter to carry the stones up toward the top, the pitch of said screw being increased toward the upper end for the purpose set forth.

In testimony whereof, I have signed my name to this specification in the presence of two subscribing witnesses.

NEIL TAYLOR.

Witnesses:
J. CLARK JEFFERSON,
ERIC SCULLIN.

Copies of this patent may be obtained for five cents each, by addressing the "Commissioner of Patents, Washington, D. C."